United States Patent [19]

Bock

[11] Patent Number: 5,206,032
[45] Date of Patent: Apr. 27, 1993

[54] APPARATUS FOR PRODUCING A PREFORM FOR THE MANUFACTURE OF A HOLLOW BODY FROM THERMOPLASTIC MATERIAL

[75] Inventor: Stefan Bock, Berlin, Fed. Rep. of Germany

[73] Assignee: Krupp Kautex Maschinenbau GmbH, Bonn, Fed. Rep. of Germany

[21] Appl. No.: 719,908

[22] Filed: Jun. 24, 1991

[30] Foreign Application Priority Data

Jun. 29, 1990 [DE] Fed. Rep. of Germany ....... 4020819

[51] Int. Cl.$^5$ .................... B29C 47/06; B29C 49/04
[52] U.S. Cl. .............................. 425/131.1; 425/133.1; 425/523; 425/532
[58] Field of Search ............. 425/133.1, 380, 532, 425/462, 467, 522, 523, 131.1

[56] References Cited

U.S. PATENT DOCUMENTS

| 3,801,254 | 4/1974 | Godtner | 425/380 |
| 3,985,490 | 10/1976 | Kader | 425/381 |
| 4,120,633 | 10/1978 | Feuerherm | 425/462 |
| 4,152,104 | 5/1979 | Przytulla et al. | 425/462 |
| 4,297,092 | 10/1981 | Goron | 425/532 X |
| 4,338,071 | 7/1982 | Daubenbuchel et al. | 425/140 |
| 4,403,934 | 9/1983 | Rasmussen et al. | 425/380 X |
| 4,422,838 | 12/1983 | Iwawaki et al. | 425/532 X |
| 4,548,569 | 10/1985 | Pitigliano et al. | 425/133.1 |
| 4,937,035 | 6/1990 | Richter | 264/515 |
| 5,004,578 | 4/1991 | Eiselen | 425/380 X |

FOREIGN PATENT DOCUMENTS

| 1629404 | 1/1971 | Fed. Rep. of Germany . |
| 2161356 | 6/1973 | Fed. Rep. of Germany . |
| 2625786 | 8/1978 | Fed. Rep. of Germany . |
| 2544609 | 10/1978 | Fed. Rep. of Germany . |
| 2100192 | 2/1983 | Fed. Rep. of Germany . |
| 2617898 | 6/1984 | Fed. Rep. of Germany . |
| 3635334 | 4/1988 | Fed. Rep. of Germany . |
| 57-75825 | 5/1982 | Japan | 425/532 |

Primary Examiner—Richard L. Chiesa
Attorney, Agent, or Firm—Panitch, Schwarze, Jacobs & Nadel

[57] ABSTRACT

An apparatus for producing a preform for the manufacture of a hollow body from thermoplastic material by extrusion blow molding has an extrusion head with a material-storage chamber which can be emptied by a piston to produce the preform. At its peripheral surface the piston has a groove-like recess providing a receiving passage which extends parallel to the direction of movement of the piston, for receiving plasticized material from the extruder connected to the extrusion head. Communicating with each of the two end regions of the receiving passage are respective duct systems through which respective flow portions of material from the extruder flow to the storage chamber.

6 Claims, 4 Drawing Sheets

APPARATUS FOR PRODUCING A PREFORM FOR THE MANUFACTURE OF A HOLLOW BODY FROM THERMOPLASTIC MATERIAL

BACKGROUND OF THE INVENTION

The invention relates generally to the production of hollow bodies and more especially preforms for forming hollow bodies, by extrusion blow molding.

An apparatus for the production of hollow bodies from thermoplastic material, the wall of which comprises a laminate having at least first and second layers, by means of extrusion blow molding, may typically comprise an extrusion unit including at least one extruder and an extrusion head having a housing which contains a storage chamber for the plasticised material and has an annular discharge or extrusion opening leading from the storage chamber, for extrusion of a preform. To give a more detailed picture of an apparatus of that nature, reference may be made to DE-A-16 29 104 in which moreover the piston is provided in its peripheral surface with a groove-like recess extending parallel to the direction of movement of the piston. With the housing, the recess forms at least one receiving passage which is disposed opposite at least one opening in the housing of the extrusion head, for the intake of thermoplastic material into the extrusion head from the at least one extruder. The length of the groove-like recess approximately corresponds to the length of the stroke movement of the piston. As the design configuration of that apparatus is such that the passage for receiving the material from the extruder is disposed opposite to the inlet opening in the housing of the extrusion head, the plastic material which passes into the housing through the inlet opening firstly flows into the receiving passage in which it then flows towards an adjoining delivery duct and into the storage chamber.

However that apparatus suffers from the disadvantage that the plasticised material coming from the extruder flows through the receiving passage over the entire length thereof, only in one position of the piston, namely the position in which the piston is in its limit position of being towards the discharge opening of the extrusion head. In all other positions of the piston, a portion of the receiving passage which is delimited on its outside by the housing is disposed at the side of the inlet passage at which it cannot communicate with the above-mentioned delivery passage, with the result that the material which enters through the inlet opening in the extrusion head cannot flow through the above-mentioned portion of the receiving passage, which is taken out of operation by virtue of the positioning of the piston. It will be appreciated that the extent of that portion of the receiving passage varies with the actual position of the piston. That consideration is particularly disadvantageous when, due to the operating procedure involved, the piston performs a stroke movement in which the material entering through the inlet opening of the assembly does not pass through the receiving passage over the entire length thereof, in any end position of the movement of the piston. However, even under other conditions of operation, it is inevitable that, in each operating cycle, the receiving passage contains material which suffers stagnation, for a given period of time; it should be noted in this respect that the material which, at the beginning of the filling stroke movement performed by the piston, first passes into the portion of the receiving passage through which plasticised material no longer flows, is last to be displaced out of the receiving passage, in the following emptying stroke movement of the piston, by the fresh material which subsequently flows into the extrusion head through the inlet opening. This 'first-in/last-out' situation for the material in the receiving passage can easily result in the material being processed suffering from a deterioration, even if the residence times of the stagnating material in the head are very short, particularly when the plastic materials involved are sensitive. Such a deterioration of the material used can in turn result in marked deteriorations in the quality of the finished products made from the preforms produced by means of the adversely affected material.

Similar considerations also apply in regard to another form of apparatus for producing hollow bodies from thermoplastic material, as disclosed in German published specification (DE-AS) No 21 61 356, in which the thermoplastic material is introduced into the extrusion head in the same fashion. The only difference in this apparatus, in comparison with that described above, is that the piston is of an annular configuration in cross-section, thus providing outer and inner peripheral surfaces.

Still another form of apparatus for producing hollow bodies from thermoplastic material, as disclosed in German published specification (DE-As) No 26 25 786, seeks to avoid the disadvantages of the two apparatuses referred to above. Therein the feed of thermoplastic material occurs axially into the piston which is also of an annular configuration, using telescopic tube members, the length of which is so selected that they are capable of bridging over and thus compensating for the stroke movements of the piston. However that arrangement suffers from the disadvantage that the relative movement as between the piston and the telescopic tube members means that the latter also produce a piston effect, and that can have a disadvantageous action in regard to the pressure and flow conditions within the extrusion head. Furthermore, that design configuration means that the extrusion head is comparatively long.

A still further apparatus for use in the production of hollow bodies from thermoplastic material by extrusion blow molding as disclosed in DE-A-36 35 334 comprises an extrusion head for the production of preforms, the wall of which comprises a laminate material. In that arrangement, the extruders for the supply of the materials for making the preforms are directly connected to the piston so that they are required to participate in the movements of the piston, thus involving an additional structural expenditure and also requiring comparatively large masses to be set in motion.

SUMMARY OF THE INVENTION

An object of the present invention is to provide an apparatus for use in the production of hollow bodies from thermoplastic material, which does not suffer from disadvantages of the above-discussed previous apparatuses.

Still another object of the present invention is to provide an apparatus for use in the production of hollow bodies from thermoplastic material by extrusion blow molding, which is such that the flow path of the material in the apparatus at least substantially avoids regions in which the material can stagnate.

Still a further object of the present invention is to provide an apparatus for producing preforms for the manufacture of hollow bodies from thermoplastic material by extrusion blow molding, which is of a comparatively simple design configuration to provide a ready and satisfactory flow of material therethrough.

In accordance with the principles of the present invention, the foregoing and other objects are attained by an apparatus for producing preforms, for use in the production of hollow bodies from thermoplastic material, by extrusion blow molding, comprising an extrusion unit including at least one extruder and an extrusion head having a housing and an annular discharge or extrusion opening. The extrusion head has at least one storage chamber for storage of material which is plasticised in the at least one extruder, and a piston for ejecting the stored material from the storage chamber to form a preform. In its peripheral surface the piston has at least one groove-like recess which extends substantially parallel to the direction of movement of the piston in the housing and which with the housing forms at least one receiving passage disposed opposite at least one inlet opening in the housing for the entry of thermoplastic material into the extrusion head. In the direction of movement of the piston the groove-like recess or receiving passage is of a length which corresponds at least to the operating stroke movement of the piston. The at least one receiving passage is connected at its first and second end regions to respective delivery duct means whereby the thermoplastic material which enters the housing of the extrusion head through said inlet opening divides into flow portions which each flow through a respective delivery duct means towards the storage chamber.

As will be even more clearly apparent from the following description of preferred embodiments of the invention, the fact that communicating with both end regions of the receiving passage is a respective duct system for accommodating flow portions of the material entering from the extruder, to guide the respective flow portions towards the storage chamber, ensures that the receiving passage has material flowing therethrough over the entire length thereof, irrespective of the stroke movement performed by the piston under the current operating conditions of the procedure involved, and thus irrespective of the position of the piston relative to the inlet opening through which the material passes into the extrusion head and thus flows into the receiving passage. The apparatus of the invention also affords the advantage that the additional expenditure involved in the second end region of the receiving passage also being connected to an associated delivery duct is slight as that structure causes little alteration in terms of the fundamental structure and configuration of the piston. It is only necessary for the components forming the piston to be subjected to an additional machining operation to provide the second delivery duct system. Still another advantage of the invention is that duct system can be of any practicable configuration to provide the desired effect.

The invention can be used to particular advantage for the production of preforms comprising a laminate structure having at least first and second layers by a co-extrusion process.

Further objects, features and advantages of the invention will be apparent from the following description of preferred embodiments.

DESCRIPTION OF PREFERRED EMBODIMENTS

Figure 1:
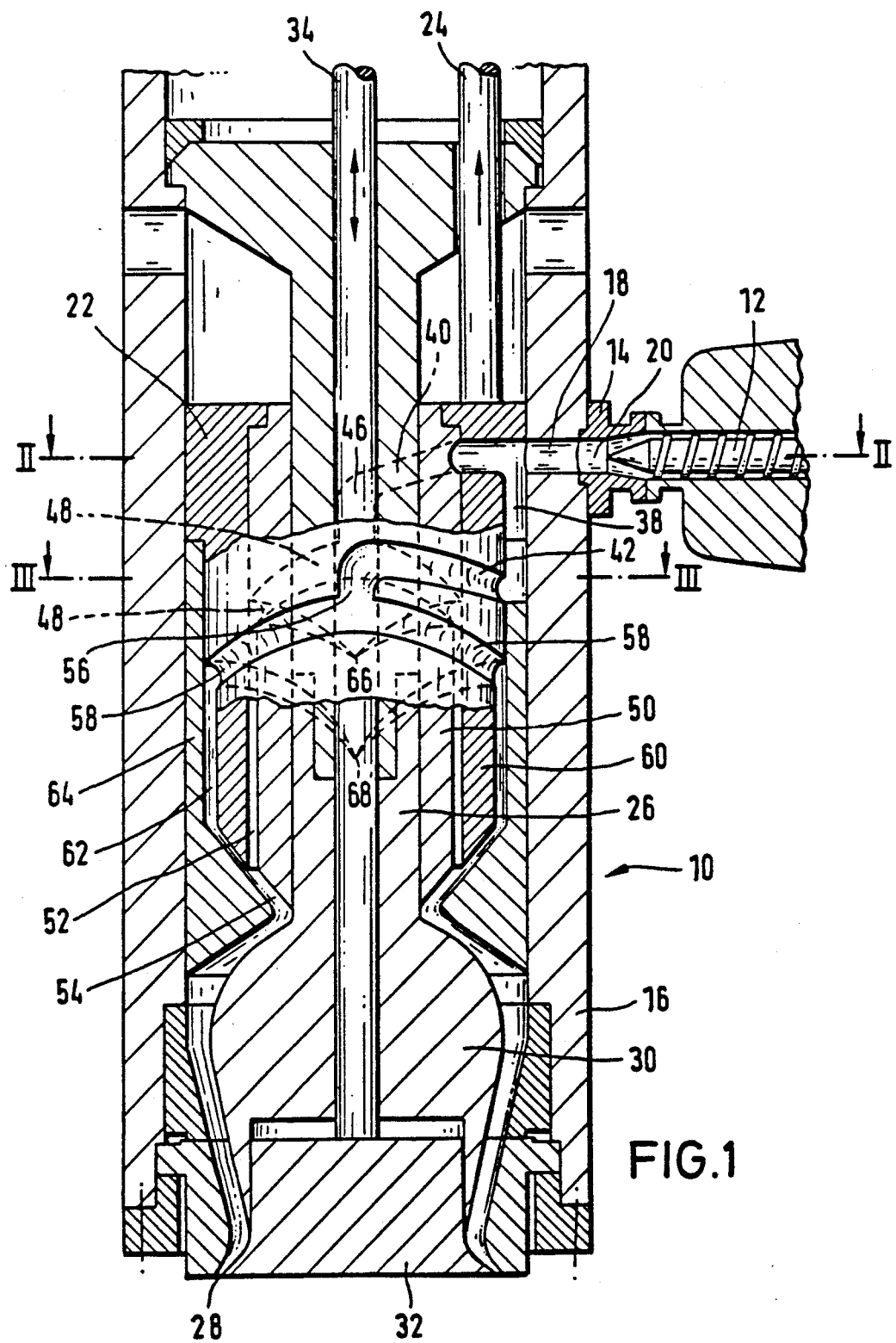
FIG. 1 is a view in longitudinal section of an extrusion head of the apparatus according to the invention, in which the piston is in its position at the end of an ejection stroke movement thereof.

Referring firstly to FIGS. 1 through 4 illustrating a first embodiment of the apparatus in accordance with the principles of the invention, reference numeral 10 generally identifies an extrusion head while reference numeral 12 identifies an extruder in which thermoplastic material for producing a preform for use in the manufacture of hollow bodies is plasticised. The extrusion head 10 is connected to the extruder 12 by way of a flange 14 in such a way that an inlet opening 18 provided in the housing 16 of the extrusion head 10, for the entry of thermoplastic material into the housing 16 from the extruder 12, is aligned with a passage 20 through which the plasticised material leaves the extruder 12.

An annular piston 22 is disposed within the housing 16 in such a way as to be axially reciprocatable therein. For that purpose, operatively associated with the annular piston 22 are piston rods as indicated at 24, of which only one is shown in FIG. 1. The piston rods 24 are suitably connected to an actuating means such as a hydraulic piston-cylinder arrangement (not shown) for actuation of the annular piston 22. In that respect reference is directed to German published specification (DE-AS) No 25 44 609 and U.S. Pat. No.4,338,071 which disclose arrangements and modes of operation of that nature and which are therefore hereby incorporated into the disclosure of this specification.

In addition, arranged within the housing 16 and in coaxial relationship therewith is a hollow bar or mandrel member 26 which cooperates with the housing 16 to delimit an annular space within which the annular piston 22 reciprocates by moving up and down in the view illustrated in FIG. 1. At its end which is towards the discharge or extrusion opening 28 of the extrusion head 10, the hollow mandrel member 26 has a thickened portion 30 within which a core member 32 is arranged in such a way as to define the inward edge of the annular discharge or extrusion opening 28. The core member 32 is axially reciprocatable within a recess in the thickened portion 30, in which it is received. The core member 32 is carried by a rod 34 which extends within the hollow mandrel member 26 and which in turn is connected to a suitable actuating assembly such as a piston-cylinder arrangement (not shown). In this respect also attention is directed to German published specification (DE-AS) No 25 44 609 or U.S. Pat. No. 4,338,071 describing the functions of the components involved and in particular control of the movement of the core member 32 for the purposes of controlling the wall thickness of a preform to be produced by the apparatus.

Figure 4:
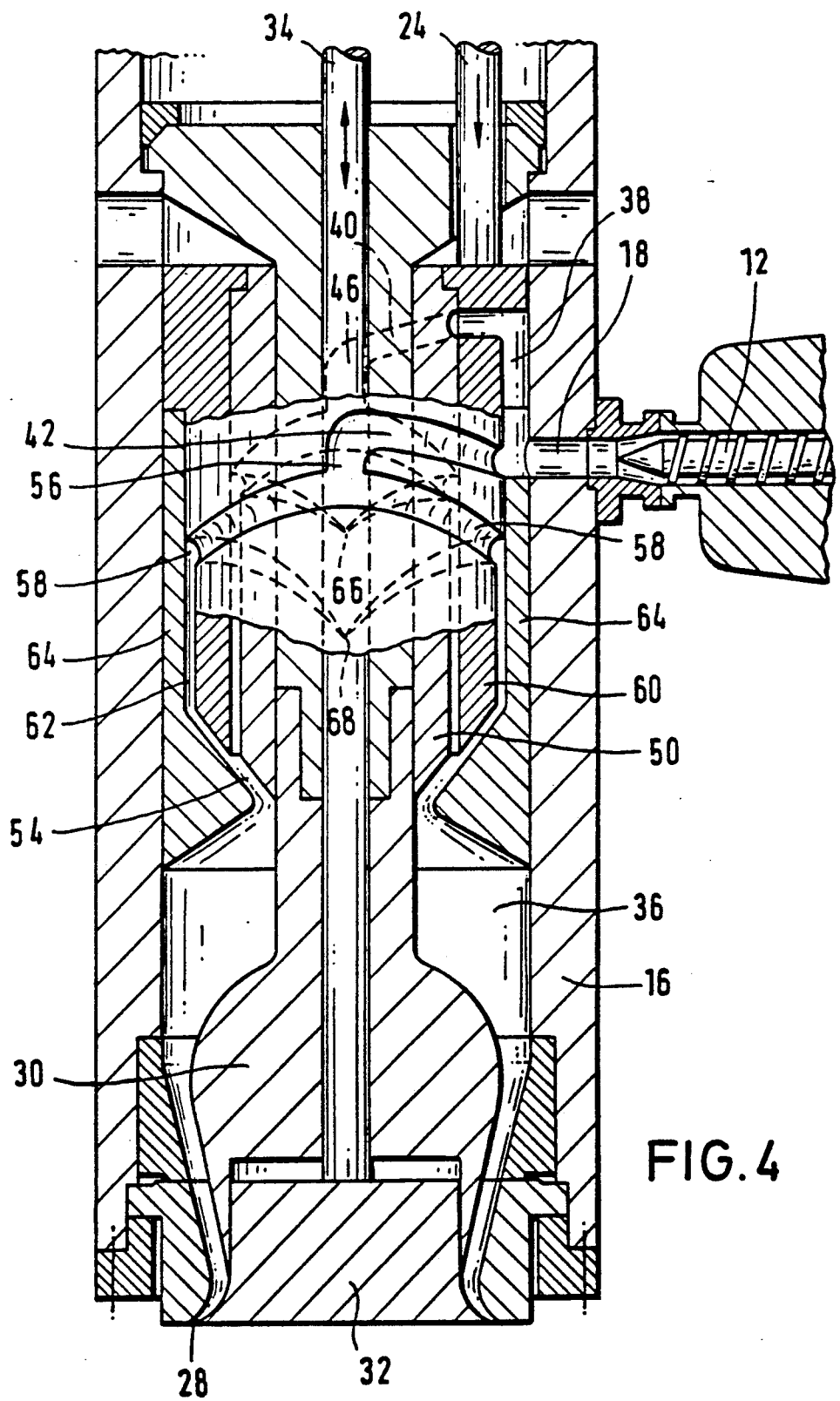
FIG. 4 is a view similar to that shown in FIG. 1 of the FIG. 1 apparatus but illustrating the piston in its position at the end of a filling stroke movement thereof.

The annular piston 22 which is thus guided by the housing 16 and the mandrel member 26 is reciprocatable between the two limit positions shown in FIGS. 1 and 4 respectively. When the piston moves from the position shown in FIG. 4 into the position shown in FIG. 1, a storage chamber or space as indicated at 36 in FIG. 4 is filled with the thermoplastic material coming from the extruder 12, with the piston being urged towards the FIG. 4 position by that material. As soon as the piston 22 has reached the limit position shown in FIG. 4, the piston is displaced towards the discharge or extrusion opening 28 by suitable actuation of its actuating piston-cylinder arrangement, until it reaches the limit position shown in FIG. 1; when that happens, the material disposed in the storage chamber indicated at 36 in FIG. 4 is displaced towards the extrusion or discharge opening 28 to form a tubular preform which thus issues from the opening 28.

Reference will now be more specifically made to the way in which v 36, by passing through the annular piston 22 and ducts provided thereon and therein. More especially, at its external peripheral surface, the annular piston 22 is provided with at least one groove-like recess which extends at least substantially parallel to the longitudinal axis of the extrusion head 10 and thus the direction of movement of the piston 22 and which with the housing 16 forms at least one receiving passage as indicated at 38. In the direction of movement of the piston 22, the recess forming the receiving passage 38 is of a length which corresponds at least to the extreme stroke movement of the piston 22. The groove-like recess forming the receiving passage 38 is so arranged that it is disposed opposite the inlet housing 18 for the intake of plasticized material into the housing 16. The receiving passage 32 for the thermoplastic material is delimited on its outward side by the inside surface of the housing 16 so that it is closed off, apart from its communication with the inlet opening 18.

Figure 2:
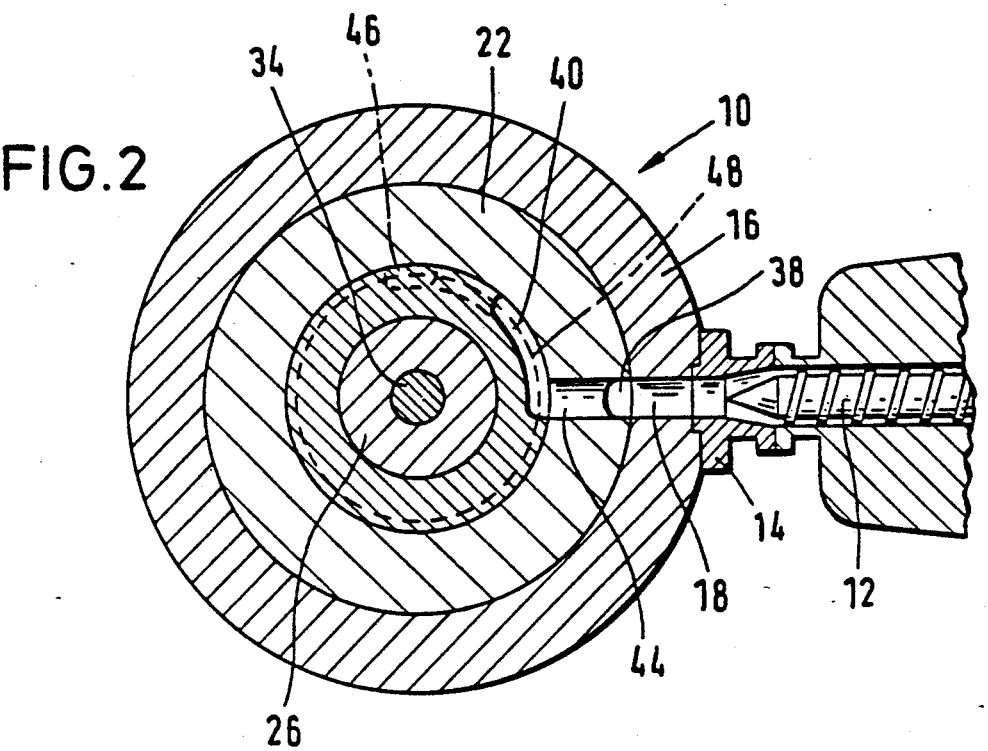
FIG. 2 is a view in section taken along line II—II in FIG. 1.
Figure 3:
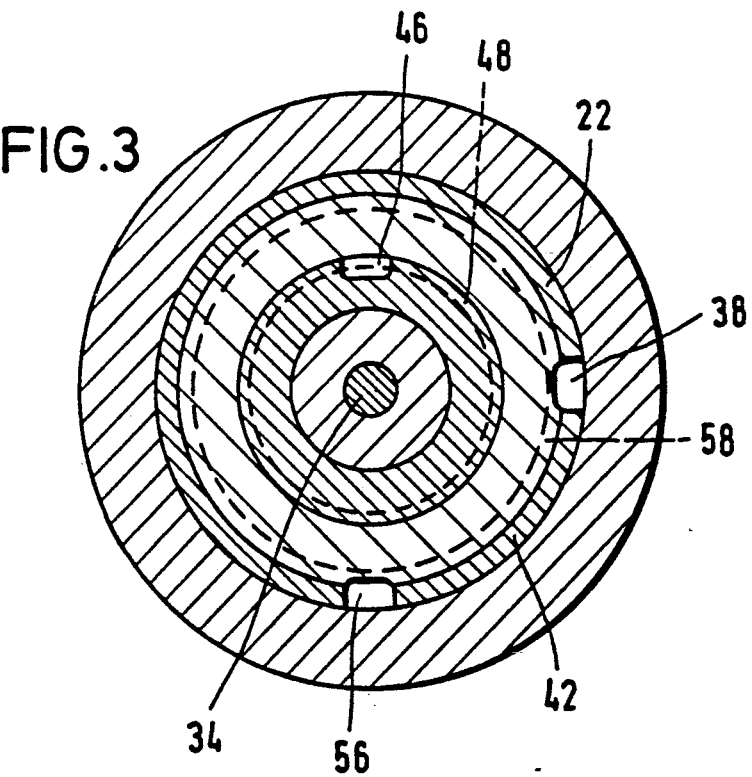
FIG. 3 is a view in section taken along line III—III in FIG. 1.

Communicating with each of the two ends of the receiving passage 38 is a respective delivery duct as indicated at 40 and 42. The ducts 40 and 42 are provided in the annular piston 22 and each forms a respective portion of a circular arc of 90°. The two ducts 40 and 42 are arranged in coaxial relationship with each other in such a way that the duct 42 which is closer to the opening 18, 20 from the extruder 12 lies on the circular arc of larger diameter. As shown in FIG. 2, also associated with the duct 40 is a radial duct portion 44 which bridges over the radial distance between the receiving passage 38 and the duct 40. At its end which is remote from the receiving passage 38, the arcuate duct 40 which extends in a somewhat inclined configuration relative to the longitudinal axis of the extrusion head, as can be clearly seen for example from FIG. 1, goes into an intermediate duct 46 which extends substantially parallel to the longitudinal axis of the extrusion head and which is adjoined by a distributor duct as indicated at 48 and which extends over 360° in a projection parallel to the longitudinal axis of the extrusion head. The distributor duct 48 is arranged on the external peripheral surface of a sleeve indicated at 50 in FIG. 1, which is part of the annular piston, and communicates in a direction towards the storage chamber 36 with an annular duct 52 which opens into a collecting duct 54. The collecting duct 54 is open towards the free end of the annular piston 22.

The other duct 42 which is arranged in the opposite direction relative to the duct 40 in the peripheral direction communicates with a vertical intermediate duct as indicated at 56, which communicates with a distributor duct 58. The distributor duct 58 is disposed coaxially with respect to the distributor duct 48 and extends also over a peripheral extent of 360°, at a larger diameter, in projection parallel to the longitudinal axis of the extruder head. The distributor duct 58 is provided on the external peripheral surface of a sleeve 60 which is also part of the annular piston 22. The distributor duct 58 communicates with an annular duct 62 which also communicates with the collecting duct 54. It will be seen therefore that the inner annular duct 52 is defined by the two mutually coaxial sleeves 50 and 60 while the outer annular duct 62 is defined by the sleeve 60 and an external sleeve member 64 which is once again also part of the piston 22.

The flow of material which passes through the inlet opening 18 into the receiving passage 38, from the extruder 12, is divided into two flow portions, independently of the position of the annular piston 22 relative to the inlet opening 18. Those two flow portions each flow into a respective one of the two ducts 40 and 42. The way in which the incoming flow of plasticised material is divided between the two ducts 40 and 42 and the respective duct systems disposed downstream thereof in the annular piston 22 depends in substance on the respective flow resistances involved which can be suitably adjusted by making the duct systems of suitable dimensions, in accordance with the way in which it is desired for the incoming flow of plasticised material to be divided between the ducts 40 and 42, for example in order for the incoming flow of material to be divided half and half to each of the two ducts 40 and 42. While admittedly the two flow portions which go to the duct 40 on the one hand and the duct 42 on the other hand will experience certain changes in the levels of flow resistance in the receiving passage 38 in the course of the operating movements of the annular piston 22, more especially in dependence on the position of the receiving passage 38 relative to the inlet opening 18, those variations are so slight that they do not have any noticeable effects on the way in which the incoming flow of plasticised material is divided into the two flow portions passing into the respective ducts 40 and 42.

Each of the two flow portions passing into the respective ducts 40 and 42 is distributed over the periphery of the assembly in the respectively associated distributor duct 48 and 50, to form a respective elongate hollow portion of flowing material within the respective duct system, and in so doing experiences an increase in width in the peripheral direction of the assembly. In a region of the apparatus configuration which is displaced through 180° relative to the respective associated duct 46 and 56 respectively, each flow portion meets itself again to form a flow configuration of annular cross-section. In other words, the two edge regions of the flow portion which spreads around an extent of 360° come together and fuse with each other. In the case of the flow portion which passes through the duct 40 and which is distributed around the periphery of the assembly in the distributor duct 48, the flow portion comes together to provide an annular cross-section in the region indicated at 66, while in the case of the flow portion which flows through the duct 40, the flow of material comes together in the region indicated at 68. It will be appreciated that the respective flow portions may fully come together to define their respective annular cross-sections somewhat lower than the respective regions 66 and 68. As the two vertical ducts 46 and 56 are arranged in positions in which they are displaced at 180° relative to each other, the respective regions in which each of the two flow portions respectively come together to provide the respective annular cross-section thereof are also displaced relative to each other through 180° so that those regions which result in longitudinally extending weld seams on the preform do not extend through the entire wall of the preform to be produced, and therefore do not constitute a weak point therein. In that respect attention is directed to German laid-open application (DE-OS) No 21 00 192 and U.S. Pat. No. 3,801,254 which disclose a preform of such a configuration.

The two flow portions which flow through the annular ducts 52 and 62 are combined in the collecting duct 54 to form a laminate comprising first and second layers, which then passes into the storage chamber 36 from the end face of the annular piston 22, which faces downwardly in FIGS. 1 and 4.

FIGS. 1 and 4 show that the illustrated configuration of the receiving passage 38 with the ducts 40 and 42 communicating therewith ensures under all operational conditions that the passage 38 does not form any dead zone in which any material is resident in an uncontrolled fashion and is only brought back into the flow of material again, at a later time.

As the embodiment shown in FIGS. 1 through 4 has only one extruder 12, the preform produced by the apparatus illustrated also comprises only one kind of material as the two flow portions which meet in the collecting duct 54 comprise the same material. However it will be appreciated that it is possible for the wall of the preform to comprise a laminate having at least first and second layers which comprise different materials.

Figure 5:
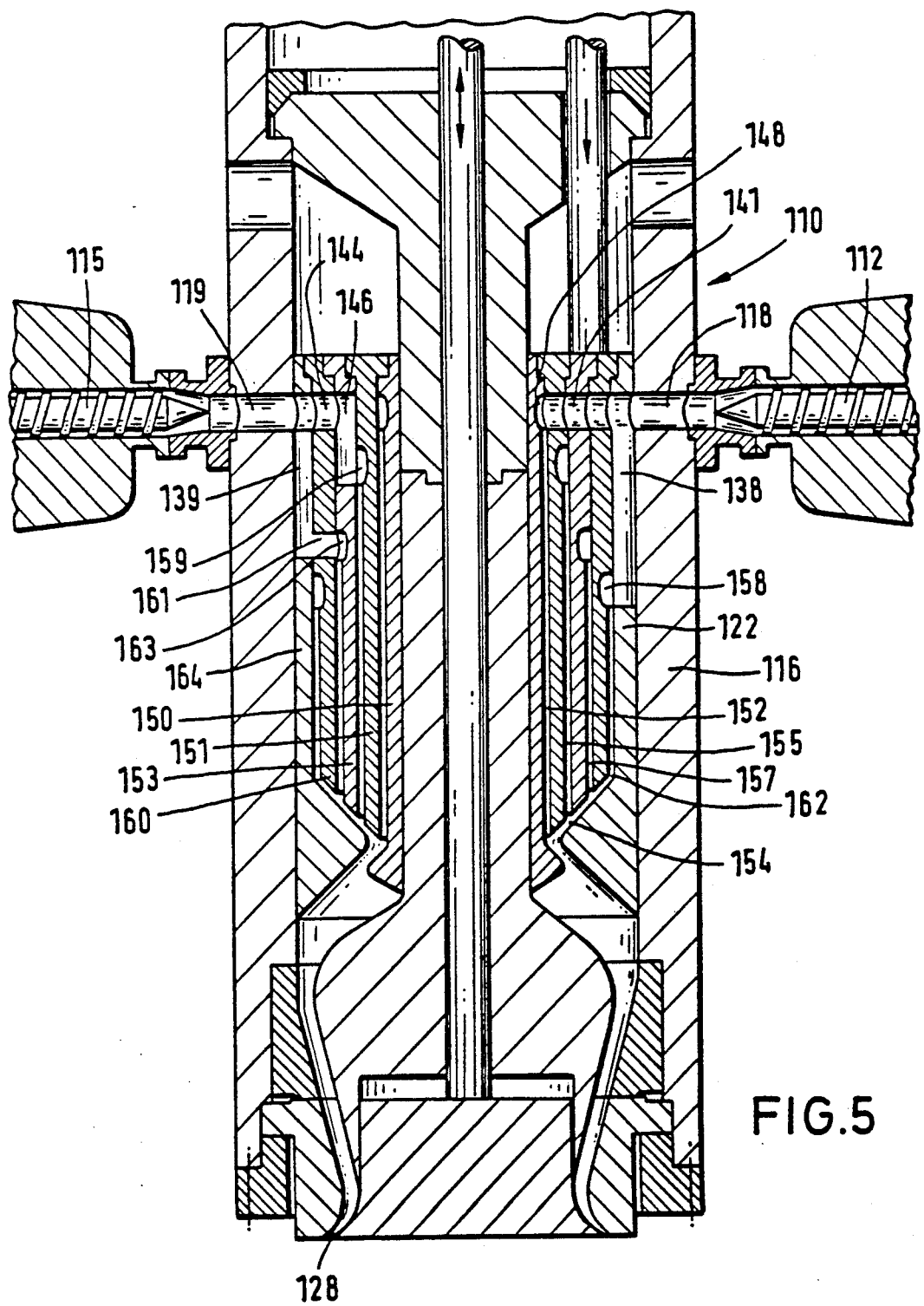
FIG. 5 is a view similar to that shown in FIG. 1 of a second embodiment of the apparatus according to the invention.

An embodiment suitable for producing a laminate preform in that way is shown in FIG. 5 to which reference is therefore now directed.

In FIG. 5, those components which correspond to components in the embodiment described above with reference to FIGS. 1 through 4 are identified by the same reference numerals but increased by 100.

Since, as indicated above, the extrusion head 110 of the apparatus illustrated in FIG. 5 serves for the production of a preform, the wall of which is a laminate comprising first and second layers of different materials, first and second extruders 112 and 115 are associated with the extrusion head 110. Accordingly the housing 116 of the extrusion head 110 has first and second inlet openings 118 and 119. The annular piston 122 is accordingly provided with first and second receiving passages 138 and 139 of which the passage 138 is disposed opposite the inlet opening 118 and the passage 139 is opposite the inlet opening 119.

The annular piston 122 has a total of five sleeves as indicated at 150, 151, 153, 160 and 164 which in pairs define four annular ducts 152, 155, 157 and 162. A common collecting duct 154 is disposed downstream of the annular ducts 152, 155, 157 and 162.

The flow of material issuing from the extruder 112 is divided in the receiving passage 138 into first and second flow portions of which one passes by way of a delivery duct 141 into the distributor duct 148 from which the material flows into the annular duct 152. The other flow portion flows from the receiving passage 138 into the delivery duct 158 which also constitutes a distributor duct which also extends over the entire periphery of the assembly and which communicates with the annular duct 162. The duct 158 is of the largest diameter of all the distributor ducts so that there is no need for a special communicating duct between the receiving passage 138 and the distributor duct 158.

The thermoplastic material from the extruder 115 first passes into the receiving passage 139 in which it is similarly divided into first and second flow portions, one of which passes through a delivery duct 144 in the form of a radial duct portion into a vertical intermediate duct indicated at 146. The intermediate duct 146 communicates with a distributor duct 159 from which the material flows into the annular duct 155. The other flow portion of material received from the extruder 115 flows firstly from the receiving passage 139 through a delivery duct 161 which is in the form of an intermediate duct and which communicates with a distributor duct 163. Therefrom the material of that flow portion flows into the annular duct 157 which is disposed at a downstream location.

It will be seen from the above-described flow paths of the flow portions, of which there are a total of four, that formed in the collecting duct 154 is a laminate in which the two outer layers comprise material coming from the extruder 112, in other words the two outer layers of the laminate comprise the same plastic material. On the other hand, the two inner layers of the laminate come from the extruder 115. In this respect, the arrangement may possibly also be such that the feed of the two flow portions into the respective ducts 159 and 161 may be at locations which are displaced relative to each other in the peripheral direction of the assembly so that consequently the regions in which a respective flow portion meets itself to define an annular cross-section of material are each displaced relative to each other, so as to avoid the formation of a welded join which extends entirely through the preform produced by the apparatus. A similar consideration may also apply in regard to the flow portions produced from the material coming from the extruder 112, although in this case there is not such great significance to be attributed to the position of the joins in the preform produced by the apparatus, by virtue of the fact that the layers of the laminate, which originate from that extruder, are separated from each other by the layers of material originating from the extruder 115.

The view of the extrusion head in FIG. 5 is greatly simplified for the sake of enhanced clarity of the drawing. Thus, it is preferable for the distributor ducts in the embodiment shown in FIG. 5 to be of a design configuration corresponding to the distributor ducts of the embodiment shown in FIGS. 1 through 4 in order in that way to promote the uniformity of distribution of the flow of material over the periphery of the assembly and to fix the regions in which the flows of material come together within the respective ducts. However that would not in any way alter the fundamental teaching of the present invention which includes providing at both end regions of the receiving passages 138 and 139 outlet ducts through which the material can flow away. The fact that in the extrusion head shown in FIG. 5, all distributor ducts extend in planes which are disposed normal to the longitudinal axis of the extrusion head also means that the receiving passage 138 is somewhat longer than the receiving passage 139 and is thus longer than the stroke movement of the annular piston 122. However that is immaterial in regard to the effect which the present invention seeks to achieve as the apparatus in accordance with the principles of the invention ensures in any event that it is possible to avoid the formation in the receiving passage 138 of dead zones in which the thermoplastic material stagnates for a certain period of time. Material flows even through the receiving passage 138 over the entire length thereof, in any position of the annular piston 122.

In regard to both of the above-described embodiments as shown in FIGS. 1 through 4 and FIG. 5 respectively, in each layer of the laminate forming the wall of a preform for the manufacture of a hollow body, by subsequent blow molding thereof, the particles of material forming the laminate layer issue from the extrusion head in the same sequence as that in which they passed into it.

As a departure from the structure illustrated in the drawing, the piston for emptying the storage chamber as indicated for example at 36 in FIG. 4 may also be of a different configuration, for example similarly to the apparatus disclosed in DE-A-16 29 404 to which reference is therefore directed, or in the form of a solid piston. It will further be appreciated that, if the piston is of a suitable size, the apparatus may have more duct systems so that it is also possible to produce preforms comprising a laminate structure having more than four layers.

It will be appreciated that the above-described apparatuses according to the invention have been set forth solely by way of example and illustration of the principles of the invention and that various modifications and alterations may be made therein without thereby departing from the spirit and scope of the invention.

What is claimed is:

1. Apparatus for producing a hollow body from thermoplastic material by blow molding, including an extrusion unit comprising at least one extruder for plasticising the thermoplastic material and an extrusion head, the extrusion head comprising: a housing having at least one inlet opening for the entry of plasticised material from said extruder into the housing, and an annular extrusion opening; at least one storage chamber in the housing for the storage of plasticised material from said extruder; a piston reciprocatable in the housing for ejecting stored material from the storage chamber to form a preform; in the peripheral surface of the piston at least one groove-like recess which extends at least substantially parallel to the direction of movement of the piston and which with the housing forms at least one receiving passage disposed opposite said inlet opening for receiving plasticised material therefrom, the length of said receiving passage in the direction of movement of the piston corresponding at least to the stroke movement of the piston; and first and second duct means communicating with respective opposing end regions of said receiving passage whereby the flow of thermoplastic material entering through said inlet opening flows as respective flow portions through each of said duct means towards said storage chamber.

2. Apparatus as set forth in claim 1 wherein said duct means comprise at least two distributor ducts which extend at least substantially in the peripheral direction of the piston and in which the respective flow of material experiences a broadening in the peripheral direction.

3. Apparatus as set forth in claim 2 wherein at least one of the distributor ducts extends over a peripheral extent of 360°.

4. Apparatus as set forth in claim 2 and comprising at least two distributor ducts which each extend over a peripheral extent of about 180° and which extend into a common annular duct which extends over 360°.

5. Apparatus as set forth in claim 1 comprising at least two said extruders and at least two said receiving passages.

6. Apparatus for producing a preform of thermoplastic material for the manufacture of a hollow body by blow molding of the preform, including an extrusion unit comprising at least one extruder for plasticising the thermoplastic material and an extrusion head, the extrusion head comprising: a housing having at least one inlet opening for the entry of plasticised material from said extruder into the housing, and an annular extrusion opening for extrusion of the preform; at least one storage chamber in the housing for the storage of plasticised material from said extruder; a piston reciprocatable in the housing for ejecting stored material from the storage chamber to form a said preform; in the peripheral surface of the piston at least one groove-like recess which extends at least substantially parallel to the direction of movement of the piston and which with the housing forms at least one receiving passage disposed opposite said inlet opening for receiving plasticised material therefrom, the length of said receiving passage in the direction of movement of the piston substantially corresponding at least to the length of the stroke movement of the piston; and first and second duct means in the piston communicating with respective opposing end regions of said receiving passage whereby the flow of thermoplastic material entering the housing through said inlet opening and passing into said receiving passage then flows as respective flow portions through each of said duct means towards said storage chamber.

* * * * *